US007974150B2

(12) United States Patent
Tulett et al.

(10) Patent No.: US 7,974,150 B2
(45) Date of Patent: Jul. 5, 2011

(54) METHODS AND APPARATUS OF SOURCE CONTROL FOR SEQUENTIAL FIRING OF STAGGERED AIR GUN ARRAYS IN BOREHOLE SEISMIC

(75) Inventors: John Richard Tulett, Yokohama (JP); James Edward Martin, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 768 days.

(21) Appl. No.: 11/552,970

(22) Filed: Oct. 26, 2006

(65) Prior Publication Data

US 2007/0153627 A1    Jul. 5, 2007

Related U.S. Application Data

(63) Continuation-in-part of application No. 10/439,904, filed on May 16, 2003, now Pat. No. 7,359,282.

(51) Int. Cl.
   *G01V 1/38*     (2006.01)
(52) U.S. Cl. .............. 367/15; 367/23; 181/110; 181/115
(58) Field of Classification Search .................... 367/15, 367/21, 23; 181/110, 111, 115, 118
   See application file for complete search history.

(56) References Cited

U.S. PATENT DOCUMENTS

| 4,210,897 A | | 7/1980 | Hutchins | |
|---|---|---|---|---|
| 4,441,174 A | * | 4/1984 | Ray et al. | 367/23 |
| 4,476,553 A | | 10/1984 | Ziolkowski et al. | |
| 4,633,970 A | * | 1/1987 | Mifsud | 181/120 |
| 4,635,746 A | * | 1/1987 | Lin | 181/107 |
| 4,660,184 A | | 4/1987 | Haukjem et al. | |
| 4,709,356 A | * | 11/1987 | Ayers | 367/19 |
| 4,721,180 A | | 1/1988 | Haughland | |
| 4,757,482 A | | 7/1988 | Fiske, Jr. | |
| H665 H | | 8/1989 | Huizer et al. | |
| 4,868,794 A | | 9/1989 | Ziolkowski et al. | |
| 4,894,807 A | | 1/1990 | Alam et al. | |
| 4,992,993 A | * | 2/1991 | Chambers | 367/21 |
| 5,184,329 A | | 2/1993 | Regnault et al. | |
| 5,548,562 A | | 8/1996 | Helgerud et al. | |
| 5,581,415 A | | 12/1996 | de Graffenried | |

(Continued)

FOREIGN PATENT DOCUMENTS

EP    0400769 A2    12/1990

(Continued)

OTHER PUBLICATIONS

Lunnon, et al. "An evaluation of peak and bubble tuning in sub-basalt seismology: modelling and results from OBS data." First Break, Dec. 2003.*

(Continued)

*Primary Examiner* — Mark Hellner
(74) *Attorney, Agent, or Firm* — Daryl R. Right; Jody DeStefanis; Jeff Griffin

(57) ABSTRACT

Methods and apparatus for controlling seismic source firings are disclosed. The methods and apparatus enable firing of seismic sources to increase pressure wave amplitude. Some methods and apparatus reduce ghosting and align first pressure peaks of multiple seismic sources. The multiple seismic sources may be fired sequentially according to active feedback mechanisms. Controlling the firing of the seismic source facilitates more accurate seismic data and a more consistent seismic source signature.

27 Claims, 8 Drawing Sheets

U.S. PATENT DOCUMENTS

| | | | |
|---|---|---|---|
| 5,995,905 | A | 11/1999 | Ikelle et al. |
| 6,026,056 | A | 2/2000 | Lunde et al. |
| 6,044,038 | A | 3/2000 | Allensworth |
| 6,091,668 | A | 7/2000 | Barber, Sr. |
| 6,188,962 | B1 | 2/2001 | Morgan et al. |
| 6,301,193 | B1 | 10/2001 | Martin et al. |
| 6,493,636 | B1 | 12/2002 | Dekok |
| 6,788,618 | B2 | 9/2004 | Clayton et al. |
| 7,218,572 | B2 * | 5/2007 | Parkes ........................ 367/23 |
| 7,466,630 | B2 * | 12/2008 | Vaage ........................ 367/144 |
| 2003/0117893 | A1 | 6/2003 | Bary |
| 2004/0008577 | A1 | 1/2004 | Moldveanu |
| 2004/0136266 | A1 | 7/2004 | Howlid et al. |
| 2004/0228214 | A1 | 11/2004 | Tulett |

FOREIGN PATENT DOCUMENTS

| | | | |
|---|---|---|---|
| FR | 2588968 | A1 | 4/1987 |
| FR | 2664063 | | 1/1992 |
| GB | 2029016 | A | 3/1980 |
| GB | 2172997 | A | 10/1986 |
| GB | 2309303 | | 7/1997 |
| GB | 2320327 | A | 6/1998 |
| GB | 2379741 | A | 3/2003 |
| JP | 11-063984 | A | 3/1999 |
| WO | WO 01/71385 | A1 | 9/2001 |
| WO | WO 01/75481 | A2 | 10/2001 |

OTHER PUBLICATIONS

Brice, Larsen, Morice, Svendsen and Ozbek "Perturbations in 4D Marine Seismic", Preview #96: Australian Society of Exploration Geophysicists, Feb. 2002.

J. F. Hopperstad, P. Vermeer, "An Azimuth-Invariant Source Array", Seg Int'l Exposition and Annual Meeting, San Antonio, Texas, Sep. 9-14, 2001.

* cited by examiner

METHODS AND APPARATUS OF SOURCE CONTROL FOR SEQUENTIAL FIRING OF STAGGERED AIR GUN ARRAYS IN BOREHOLE SEISMIC

RELATED APPLICATIONS

This is a continuation-in-part of U.S. patent application Ser. No. 10/439,904 filed 16 May 2003 and entitled "Methods and Apparatus of Source Control for Borehole Seismic."

FIELD

The present invention relates generally to methods and apparatus for exploring subsurface formations. More particularly, the present invention relates to methods and apparatus for controlling seismic sources.

BACKGROUND

Subsurface formation analysis has enabled more efficient oil and gas recovery over the past several decades. In recent years, petroleum exploration has been occurring at increasingly deeper levels of water. As the water levels increase and the wells drilled lengthen, the subsurface formations often become more complex. To facilitate more efficient petroleum recovery, it is often desirable to generate a vertical seismic profile.

A vertical seismic profile (VSP) is a class of borehole seismic measurements used for correlation between surface seismic receivers and wireline logging data. VSPs can be used to tie surface seismic data to well data, providing a useful tie to measured depths. Typically VSPs yield higher resolution data than surface seismic profiles provide. VSPs enable converting seismic data to zero-phase data as well as enable distinguishing primary reflections from multiples. In addition, a VSP is often used for analysis of portions of a formation ahead of the drill bit.

Narrowly defined, VSP refers to measurements made in a vertical wellbore using acoustic receivers inside the wellbore and a seismic source at the surface near the well. In a more general context as used herein, however, VSPs vary in well configuration, the number and location of sources and acoustic receivers, and how they are deployed. Nevertheless, VSP does connote the deployment of at least some receivers in the wellbore. Most VSPs use a surface seismic source, which is commonly a vibrator on land, or an air gun in marine environments.

There are various VSP configurations including zero-offset VSP, offset VSP, walkaway VSP, vertical incidence VSP, salt-proximity VSP, multi-offset VSP, and drill-noise or seismic-while-drilling VSP. Check-shot surveys are similar to VSP in that acoustic receivers are placed in the borehole and a surface source is used to generate an acoustic signal. However, a VSP is a more detailed than a check-shot survey. The VSP receivers are typically more closely spaced than those in a check-shot survey; check-shot surveys may include measurement intervals hundreds of meters apart. Further, a VSP uses the reflected energy contained in the recorded trace at each receiver position as well as the first direct path from source to receiver while the check-shot survey uses only the direct path travel time.

While VSPs can provide valuable information about a formation, source perturbations (e.g. shot to shot variations in the seismic signature of an air gun) introduce error into the raw seismic data which percolates through the processing chain to the final images produced. VSP source perturbations can limit the full range of usefulness that VSPs data can provide. In marine surface seismic acquisitions, these source perturbations can be well controlled through digital gun controllers and processes such as source signal estimation (see, for example, U.S. Pat. Nos. 4,757,482; 5,581,415; 5,995,905; and 4,476,553, which are hereby incorporated by reference).

However, in VSP acquisitions, particularly marine VSPs, there is currently no standard gun controller to limit error introduced by source perturbations. This lack of control is problematic, because the shot to shot variations in the source wavelet are often significant. These errors are caused by variations in the timing and firing pressure, which can be pronounced. In rough seas, elevation changes can also cause errors. Some have added an uncalibrated hydrophone near the source (usually located a few meters from the source) to provide partial information useful for correcting time break errors (errors attributable to time differences for high waves, irregular source firings, etc.). Nevertheless, the partial information from the added hydrophone is not sufficient for a full shot deconvolution because of the proximity of the source, and in practice, such hydrophones are arbitrarily placed in relation to the source and do not record with sufficient signal fidelity to be useful. As a result, only gross errors in VSP source data are currently corrected. Therefore, sophisticated seismic data processing methods may not be used because current methods do not provide VSP seismic source information with the precision necessary to make sophisticated processing meaningful.

Further, some seismic systems include a cluster or array of air guns. Some of these systems fire all of the air guns simultaneously. The intent of the multiple air guns is to increase the amplitude of the seismic signal. However, the vertical spacing between the air guns and sea-surface results in an offset of the signals and what is sometimes referred to as "ghosting."

SUMMARY

The present disclosure addresses at least some of the above-described needs and others. Specifically, one embodiment provides a seismic system. The seismic system comprises a first seismic source, a second seismic source spaced vertically from the first seismic source, a first seismic sensor at the second seismic source, and a controller operatively connected to the first and second seismic sources and the first seismic sensor. The controller is programmed to fire the first seismic source and adjust a firing time of the second seismic source based on feedback from the first seismic sensor. In one embodiment, the controller is programmed to adjust the firing time of the second seismic source based on feedback from the first seismic sensor to align a first pressure peak of the second seismic source with a first pressure peak of the first seismic source. One embodiment further comprises a third seismic source spaced vertically from the second seismic source and a second seismic sensor at the third seismic source. The controller is operatively connected to the third seismic source and the second seismic sensor, and the controller is programmed to adjust a firing time of the third seismic source based on feedback from the second seismic sensor to align a first pressure peak of the third seismic source with the first pressure peaks of the first and second seismic sources.

In one embodiment of the seismic system, each of the seismic sources comprises an air gun chamber of different volume to compensate for variations in source signature caused by increasing water pressure with depth. In some embodiments, the controller is an in-sea controller. In one embodiment, the first and second seismic sources comprise in-sea air guns.

One embodiment of the seismic system further comprises a plurality of receivers deployed in a borehole and a synchronization unit operatively connected to the plurality of receivers and the controller. The synchronization unit synchronizes staggered seismic source firing with recording of the plurality of receivers in the borehole.

One embodiment of the seismic system further comprises a plurality of additional vertically spaced seismic sources, and a seismic sensor at each of the plurality of additional vertically spaced seismic sources. The controller is operatively connected to each of the plurality additional seismic sources and each seismic sensor. The controller is programmed to adjust the firing time of each of the plurality of additional vertically spaced seismic sources based on feedback from the seismic sensors to align first pressure peaks of each of the plurality of additional vertically spaced seismic sources with a first pressure peak of the first seismic source. In some embodiments, each of the seismic sources comprises an air gun chamber of different volume to compensate for variations in source signature caused by increasing water pressure with depth.

One embodiment provides a survey system comprising a plurality of receivers deployed in a subsea borehole, a seismic source array aligned vertically in-sea at the surface, at least one seismic sensor at one or more individual sources of the seismic source array, and an in-sea source controller configured to sequentially fire the individual sources of the seismic source array and align first pressure peaks of the individual sources. In one embodiment, at least one seismic sensor comprises a seismic sensor at each individual source except for a first individual source, and the seismic sensors provide feedback to the in-sea source controller to facilitate the aligning of first pressure peaks. In one embodiment, the in-sea source controller receives feedback from progressively deeper sensors of at least one seismic sensor and adjusts firing of the individual sources in response to the feedback to align the first pressure peaks. In one embodiment, the system is at a fixed horizontal set of coordinates. Some embodiments of the in-sea source controller are programmed to fire the seismic source array at a constant absolute height. In some embodiments, the in-sea source controller is programmed to fire the seismic source array at a fixed vertical location with respect to the receivers deployed in the subsea borehole. One embodiment further comprises a synchronization unit operatively connected to the plurality of receivers and the controller, and the synchronization unit synchronizes the sequential source firing with recording of the plurality of receivers deployed in the subsea borehole. In some embodiments, the in-sea source controller is configured to dynamically change the sequential firing of the individual sources of the seismic source array to align first pressure peaks of the individual sources.

One aspect provides a method of controlling in-sea seismic source firing. The method comprises dynamically staggering the firing of an in-sea array of seismic sources, and increasing the amplitude of a pressure wave generated by the staggered firing. In one embodiment, dynamically staggering the firing comprises receiving feedback from one or more seismic sensors local to the in-sea array, and staggering a firing sequence of the in-sea array of seismic sources based on the feedback. In one embodiment, dynamically staggering the firing comprises receiving seismic feedback from a plurality of seismic sensors (where there is at least one of the plurality of seismic sensors associated with all but a first individual source of the in-sea array), and staggering a firing sequence of the in-sea array of seismic sources based on the feedback. In some embodiments, dynamically staggering the firing comprises firing a first individual seismic source of the in-sea array, detecting a first pressure peak resulting from the firing of the first individual seismic source, sending first pressure peak data to a controller, and firing a second individual seismic source of the in-sea array based on first pressure peak data. In one embodiment, dynamically staggering the firing comprises firing a second seismic source of the in-sea array based on first pressure peak data, and increasing the amplitude of a pressure wave comprises aligning a first pressure peak of the second seismic source with the first pressure peak of the first seismic source. In one embodiment, dynamically staggering the firing comprises firing a third seismic source of the in-sea array based on the first pressure peak data resulting from the firing of the first and second seismic sources, and increasing the amplitude of a pressure wave comprises aligning first pressure peaks of the second and third seismic sources with the first pressure peak of the first seismic source.

According to one aspect of the method of controlling in-sea seismic source firing, the dynamically staggering firing comprises (a) firing a seismic source of the in-sea array, (b) detecting a first pressure peak resulting from the firing of the seismic source, (c) sending first pressure peak data to a controller, (d) firing a subsequent seismic source of the in-sea array based on first pressure peak data; and (e) repeating steps (a)-(d) for each seismic source of the in-sea array, and increasing amplitude of a pressure wave comprises aligning the first pressure peaks of each seismic source.

One aspect provides a method of seismic surveying. The method comprises firing a first air gun under water at a first depth closest to surface, monitoring a first pressure wave from the first seismic source with a first sensor, feeding back monitored first pressure wave data to a controller, firing a second air gun at a second depth, the second depth deeper than the first depth, based on monitored first pressure wave data to substantially maximize wave amplitude by superposition of pressure waves from the first and second air guns, and receiving wave data related to a subsurface formation resulting from the firing of the air guns. In one embodiment, the method further comprises firing additional air guns sequentially, each deeper than the last, based on monitored pressure wave data from previous firings, to further substantially maximize wave amplitude by superposition of pressure waves from all air guns.

One aspect provides a method comprising firing an air gun under water at a first location, measuring a downgoing pressure wave resulting from the firing of the air gun at a second, deeper location; subsequently firing additional air guns, and actively adjusting a firing time of each subsequently fired additional air gun to continually align pressure peaks of all of the air guns. In one embodiment, actively adjusting further comprises increasing an amplitude of the downgoing pressure wave. In one embodiment, the actively adjusting comprises feeding measurements of the downgoing pressure wave at sequentially deeper locations to an air gun controller.

One embodiment provides a source control system for borehole seismic surveys comprising an underwater seismic source, at least one receiver deployed in a subsea borehole and configured to receive seismic waves generated by the underwater seismic source, a handling system configured to deploy the seismic source, and a source controller configured to repeatedly fire the underwater seismic source at a same height. In one embodiment, the source controller is configured to repeatedly fire the underwater seismic source only at the same height. In one embodiment, the source controller is configured to repeatedly fire the underwater seismic source at a same absolute height. In one embodiment, the source controller is configured to repeatedly fire the underwater seismic source only at a same absolute height.

One aspect provides a method of using a source control system, comprising deploying at least one receiver in a borehole, deploying a seismic source at or near a sea surface at a predetermined location relative to the borehole receiver, controlling the firing of the seismic source with an in-sea source controller, and synchronizing the seismic source firing with the borehole receiver recording so that seismic waves generated by the seismic source are received by the borehole receiver. The method may further comprise automatically tuning the seismic source. Automatically tuning may comprise aligning first pressure peaks of individual seismic sources. The seismic waves received by the borehole receivers may be used to generate a VSP. In one embodiment, the method further comprises measuring a seismic source firing pressure directly at the seismic source and measuring a seismic source depth in water directly at the seismic source.

One aspect provides a method of improving a VSP survey. The method comprises deploying a seismic source, deploying at least one receiver in the borehole, and controlling firing of the seismic source to repeatedly fire at a same height above a sea floor despite wave and tide variations. One embodiment further comprises synchronizing seismic source firing, downhole seismic receiver recording, and surface seismic receiver recording with a time standard. One embodiment comprises combining statistical quality control analysis of surface source performance with borehole receiver performance.

One embodiment provides a source control system for borehole seismic surveys comprising at least one receiver deployed in a borehole, a seismic source, a handling system configured to deploy the seismic source at an absolute height to the borehole receiver, an umbilical, an in-sea source controller configured to synchronize the firing of the seismic source with borehole receiver recording, and a bathymetry sensor configured to ensure repeated firing of the seismic source at the absolute height to compensate for variations in marine conditions.

One embodiment provides a survey system comprising a plurality of receivers deployed in a borehole, a seismic source at or near a sea surface, a handling system, an umbilical, an in-sea source controller configured to control the firing of the seismic source, a synchronization unit operatively connected to the in-sea source controller and configured to synchronize recording of the plurality of receivers in the borehole and firing of the seismic source, and a GPS sensor in communication with the source controller such that the seismic source is fired at a same, absolute firing height of the seismic source to compensate for variations in marine conditions.

One embodiment provides a source control system for borehole seismic surveys comprising an underwater seismic source, at least one receiver deployed in a subsea borehole and configured to receive seismic waves generated by the underwater seismic source, a stationary handling system configured to deploy the underwater seismic source, a vertical height sensor for detecting water height operatively connected to the underwater seismic source, and a source controller programmed to repeatedly fire the underwater seismic source at a same water height based on information from the vertical height sensor.

In some aspects, a source control system includes a seismic source, a handling system, an umbilical, and an in-sea source controller for controlling the firing of the seismic source, where the seismic source generates seismic waves received by borehole receivers. The system may also include a float attached above the seismic source and in-sea source controller, with a motion sensor such as a global position system (GPS) unit mounted to the float. The motion sensor detects changes in height due to waves or variations in tide. The system may further include a switch controllable by the in-sea source controller to trigger firing of the seismic source at an absolute height. According to some aspects, the seismic source is an air-gun array. The system may also include one or more in-sea sensors having a fixed geometry relative to the seismic source. The one or more in-sea sensors may include a calibrated hydrophone, a depth sensor, and/or a firing pressure sensor. The calibrated hydrophone measures pressure signals at the seismic source for relay to a processor. In one embodiment, analog signals transmitted from the seismic source are digitized by the in-sea controller for subsequent relay to the processor. Accordingly, the system may include relatively short analog communication lines extending between the seismic source and the in-sea controller, with all remaining communication lines being digital. The umbilical may include digital communication lines, but no analog communication lines.

Another aspect of the invention provides a survey system including a plurality of receivers deployed in a borehole, a seismic source at a sea surface, a handling system, an umbilical, and an in-sea source controller for controlling the firing of the seismic source. The system may include a GPS unit operatively connected to the in-sea source controller and mounted to a float supporting the seismic source and in-sea source controller. The GPS unit receives Universal Time Coordinated (UTC), by which recording of the plurality of receivers and firing of the seismic source are synchronized. The system may further include a plurality of in-sea sensors such as a calibrated hydrophone, a depth sensor, and a pressure sensor. According to some aspects, the seismic source is an air-gun array. The air-gun array may be horizontally staggered. The air-gun array may be vertically staggered. In some aspects, the umbilical includes digital communication lines as well as an air supply. The system may also include a float, where the float includes a motion sensor for detecting changes in absolute height (due for example, to waves or variations in tide). The system may include a switch controlled by the in-sea source controller to trigger firing of the seismic source repeatedly at a same absolute height by taking into account data from the motion sensor. According to some aspects of the system, the handling system includes a crane.

Another aspect of the invention provides a method of using a source control system including integrating firing of a seismic source with a navigation system to fire the seismic source at either a precise time or precise position of the source. The method may also include automatically tuning a seismic source, measuring a seismic source pressure wave directly at the seismic source, and measuring a seismic source depth in water directly at the source. The synchronizing of the source firing and downhole seismic receiver recording may be facilitated by a GPS system, and surface seismic receiver recording may also be synchronized with the source firing and downhole seismic receiver recording. The method may also include combining statistical quality control analysis of the surface source performance with borehole receiver performance and correcting for source signature variations. The correcting may include calibrating a near field sensor signal based on fixed geometry between the seismic source and a local sensor, reconstructing the far field signature of the seismic source from a measured near field signature, and maintaining a true amplitude for surface seismic calibrations, AVO surveys, and time lapse surveys.

Another aspect of the invention provides a method of improving a VSP survey including automatically tuning a seismic source, measuring a seismic source pressure directly at the seismic source, measuring a seismic source depth in water directly at the source, integrating firing of the seismic source with a navigation system to fire the seismic source at either a precise time or precise position of the source; synchronizing seismic source firing, downhole seismic receiver recording, and surface seismic receiver recording with UTC time; combining statistical quality control analysis of surface source performance with downhole receiver performance, and correcting for source signature variations. The correcting may include calibrating a near field sensor signal based on fixed geometry between the seismic source and a local sensor. The correcting may further include reconstructing a far field signature of the seismic source from measured nearfield signature. The method may also include comparing measured source signatures to a reference source signature, where the reference source signature is based on a seismic source reference far field signature on file at a well site. Further, the method may include integrating seismic source firing at a precise position of the source by taking vertical GPS measurements. In addition, the method may include comparing the seismic source depth measurement with a predetermined level and may include disabling the firing of the seismic source if the depth measurement is less than or greater than the predetermined level.

Another aspect of the invention provides a source control system including a seismic source, a handling system, an umbilical, an in-sea source controller for controlling the firing of the seismic source, and a bathymetry sensor for making tidal corrections. The seismic source generates seismic waves received by borehole receivers, and the system may include a GPS time synchronization unit.

Some aspects contemplate a source control system for borehole seismic surveys including a seismic source, at least one receiver deployed in a borehole and configured to receive seismic waves generated by the seismic source, a handling system configured to deploy the seismic source at a certain height relative to the borehole receiver, and an in-sea source controller configured to fire the seismic source only when the seismic source is at the certain height relative to borehole receivers. Further aspects contemplate a survey system including a plurality of receivers deployed in a borehole, a seismic source cluster at a sea surface at a predetermined location relative to the borehole receivers, a handling system, an umbilical, and an in-sea source controller configured to sequentially fire individual sources of the seismic source cluster and align first pressure peaks of the individual sources. A further aspect contemplates a method of using a source control system including deploying at least one receiver in a borehole, deploying a seismic source at a sea surface at a predetermined location relative to the borehole receiver, controlling the firing of the seismic source with an in-sea source controller, and synchronizing the seismic source firing with the borehole receiver recording so that seismic waves generated by the seismic source are received by the borehole receiver. Other aspects include automatically tuning the seismic source, for example, by aligning first pressure peaks of individual seismic sources, and using the seismic waves received by the borehole receivers to generate a VSP. A seismic source firing pressure may be measured directly at the seismic source, and a seismic source depth in water may be measured directly at the seismic source.

Other aspects contemplated herein include a method of improving a VSP survey including deploying a seismic source at a predetermined location relative to a borehole, deploying at least one receiver in the borehole, and controlling firing of the seismic source to fire at a predetermined height above a sea floor based on variations in height due to marine conditions. A bathymetry sensor may be configured to ensure a constant, absolute firing height of the seismic source to compensate for variations in marine conditions. In yet another aspect, a survey system includes a plurality of receivers deployed in a borehole, a seismic source at a sea surface, a handling system, an umbilical, an in-sea source controller configured to control the firing of the seismic source, a synchronization unit operatively connected to the in-sea source controller and configured to synchronize recording of the plurality of receivers in the borehole and firing of the seismic source, and a GPS sensor in communication with the source controller, the system being configured to fire the seismic source at a constant, absolute firing height of the seismic source to compensate for variations in marine conditions.

Aspects herein contemplate an in-sea source controller that is configured to fire the seismic source only at a predetermined height relative to subsea borehole receivers. A source control system for borehole seismic surveys including an underwater seismic source, at least one receiver deployed in a subsea borehole and configured to receive seismic waves generated by the underwater seismic source, a stationary handling system configured to deploy the underwater seismic source, a vertical height sensor for detecting water height operatively connected to the underwater seismic source, and a source controller programmed to fire the underwater seismic source at a predetermined water height based on information from the vertical height sensor. A source control system for borehole seismic surveys including an underwater seismic source, at least one receiver deployed in a subsea borehole and configured to receive seismic waves generated by the underwater seismic source, a handling system configured to deploy the seismic source, and a source controller configured to fire the underwater seismic source at a same absolute height.

Other aspects herein include a source control system for borehole seismic surveys comprising an underwater seismic source; at least one receiver deployed in a subsea borehole and configured to receive seismic waves generated by the underwater seismic source; a handling system configured to deploy the seismic source; and a source controller configured to repeatedly fire the underwater seismic source at a same height. In aspects of the disclosure, the source controller may be configured to repeatedly fire the underwater seismic source only at the same height. The source controller may be configured to repeatedly fire the underwater seismic source at a same absolute height. The source controller may be configured to repeatedly fire the underwater seismic source only at a same absolute height.

BRIEF DESCRIPTION OF THE DRAWINGS

The accompanying drawings illustrate certain embodiments and are a part of the specification.

Figure 1A:
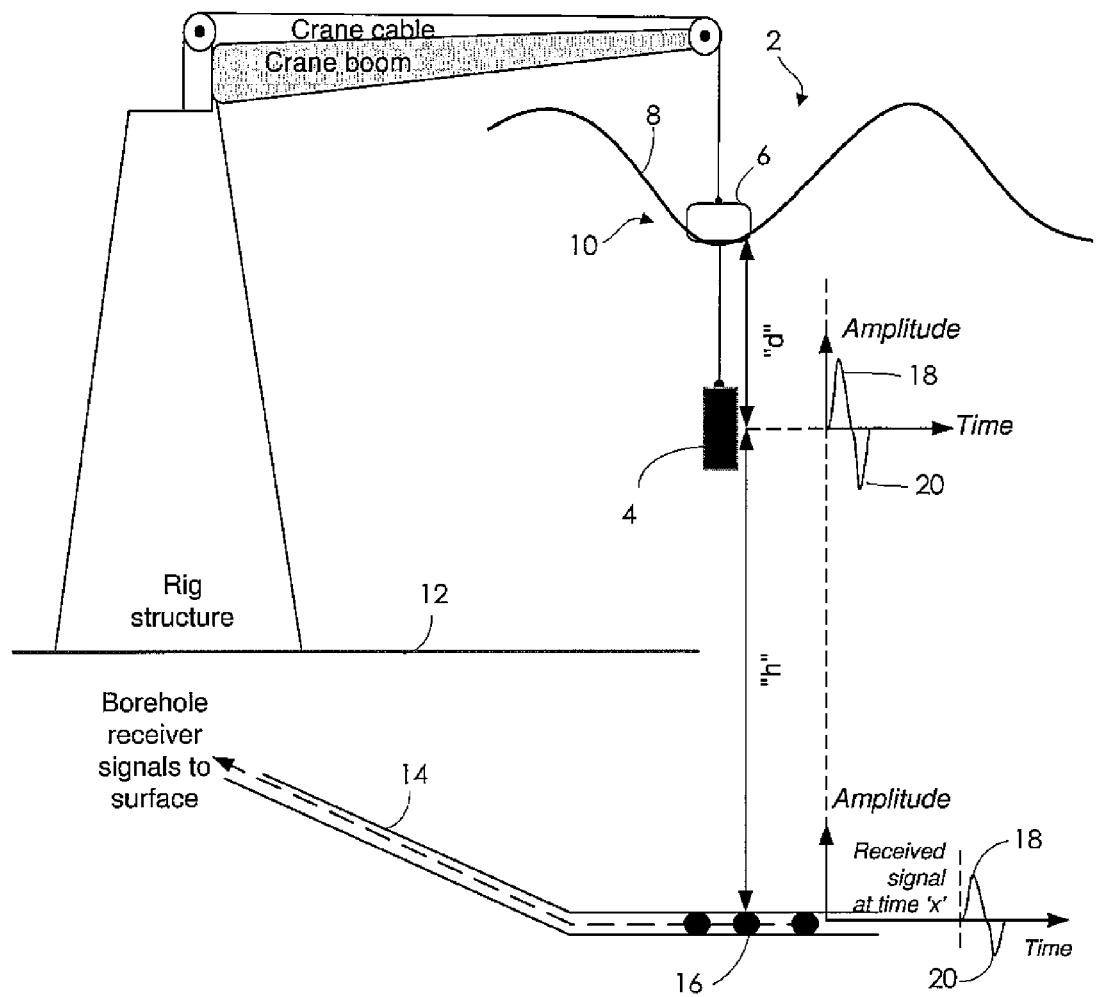
FIG. 1A is a simplified view of an offshore rig positioned over a borehole containing a plurality of receivers; The rig is shown supporting a survey apparatus with a float in a wave trough.

Throughout the drawings, identical reference numbers indicate similar, but not necessarily identical elements. While the principles described herein are susceptible to various modifications and alternative forms, specific embodiments have been shown by way of example in the drawings and will be described in detail herein. However, it should be understood that the invention is not intended to be limited to the particular forms disclosed. Rather, the invention includes all modifications, equivalents and alternatives falling within the scope of the appended claims.

DETAILED DESCRIPTION

Illustrative embodiments and aspects of the invention are described below. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such a development effort might be complex and time-consuming, but would nevertheless be a routine undertaking for those of ordinary skill in the art having the benefit of this disclosure.

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present invention. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Some aspects contemplate methods and apparatus for use in vertical seismic profile (VSP) and other borehole seismic surveys. The principles described herein facilitate generation of more accurate seismic source information than previously possible, adding precision to seismic data to enable sophisticated seismic data processing. Some methods and apparatus described herein may be implemented to correct or compensate for variations in marine conditions, and/or provide for synchronization between source firing, downhole seismic receiver recording, and (optionally) surface seismic receiver recording. However, while the methods and apparatus are shown in marine implementations, they may also be used for land applications.

Some methods and apparatus facilitate better seismic data analysis by more accurately providing source signatures. More accurate source signatures are a result of a source control system described below which may, for example, vary seismic source firing to coincide with an absolute height for repeated shots or every shot in a marine application. Sea swells and tidal variations can introduce noise to seismic data and render it difficult or impossible to estimate the source signature. For example, sea swells of 3 m can lead to a 2 ms time displacement due to the potential differences in vertical displacement of a buoyed source. Larger swells can have an even more significant effect. For example, when shots are stacked during a rig-side VSP or an offset VSP, the change in travel time for each shot results in smearing of the seismic signals received during stacking and a loss of high frequencies. In fact, because of the noise that can be created by rough seas, marine surveys have previously been limited to conditions when sea swells are something less than approximately 3 to 4 m. Similarly, sea swells, tidal variations, and other phenomena can have an effect on transit time accuracy. Without the compensation methods and apparatus taught herein, seismic signals received during stacking are smeared and transit time measurements are inaccurate when sea conditions vary.

Figure 1B:
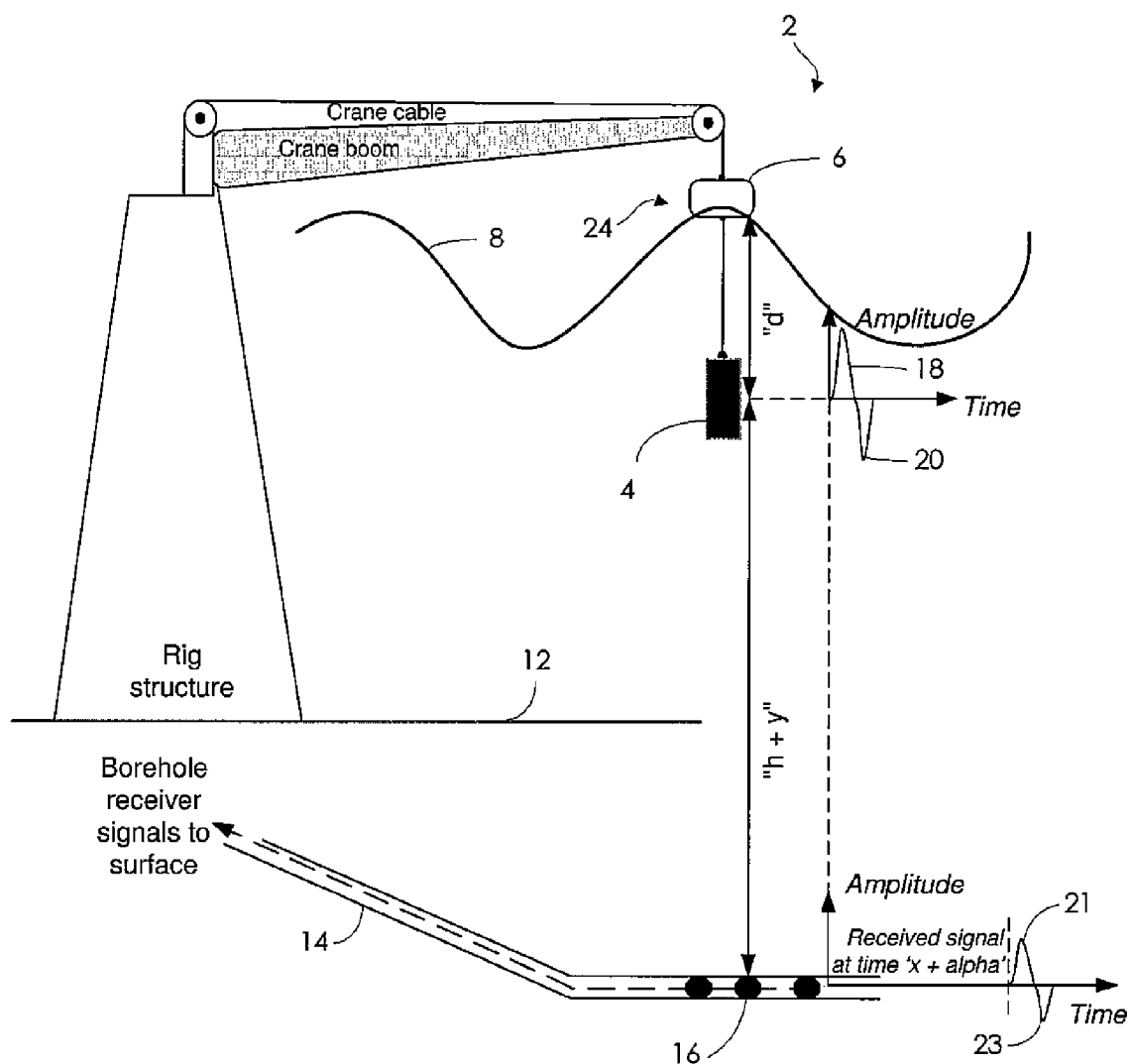
FIG. 1B is a simplified view of the offshore rig positioned over a borehole containing a plurality of receivers as shown in FIG. 1A. However, in FIG. 1B the rig is shown supporting a survey apparatus with a float at a wave peak.

FIGS. 1A-1B illustrate the problems described above with regard to smearing and transit time inaccuracies presented by variations in marine conditions. As shown in FIG. 1A, a seismic measure system (2) may includes a seismic source (4) suspended below a float (6) a distance "d" from a sea surface (8). The distance "d" between the float (6) and the seismic source (4) remains constant, but the absolute height of both the float (6) and therefore the seismic source (4) change with the height of the sea surface (8). "Absolute" height means a height measurement that is independent of arbitrary standards. Absolute height may be measured, for example from a same, fixed reference point such as the center of the earth. Absolute height is not relative to other heights that might change. Just as "absolute" temperature, pressure, and humidity (for example) are independent of any local or relative measurement, absolute height as used herein may be considered in reference to a single point of origin (such as the center of the earth). Therefore, the absolute height of the seismic source (4) suspended from a float (6) on the sea surface (8) changes as the sea surface rises and falls. However, the position of a sea floor (12), a borehole (14), and receivers (16) in the borehole (14) is fixed and absolute and does not change with variations of the sea surface (8).

FIG. 1A illustrates the float (6) in a trough (10) of the sea surface (8). The seismic source (4) suspended from the float (6) is at a height "h" above the receivers (16) in the borehole when the float (6) is in the trough (10). If the seismic source (4) is fired at time zero (0), a source signal (18) and source ghost signal (20) are generated. The source signal (18) and source ghost signal (20) are received by the receiver (16) at time "x". Time "x" is based on the speed of sound in the sea and the distance "h." FIG. 1B illustrates the float (6) at a different time such that the float (6) is located at a peak (24) of the varying sea surface (8). The seismic source (4) is still suspended from the float, and the distance between the float (6) and the seismic source (4) remains "d." However, the seismic source (4) is now at a height "h+y" above the receivers (16). The additional "y" distance is a measure of the change in sea surface height (8) due, for example, to waves (but could also be due to variations in tide). If the seismic source (4) is fired at time zero (0) again, the source signal (18) and the source ghost signal (20) are received by the receiver (16) at time "x+alpha." It takes "alpha" time longer for the seismic source signal (21) and the source ghost signal (23) to travel through the additional distance "y" of water. Thus, transit times can vary due to changes in the sea surface (8)

conditions and lead to smearing and inaccurate results. However, according to principles described herein, controllers repeatedly fire seismic sources at a same absolute height (for example at height "h" of the seismic source(s) (4) above the receivers (16)) so that transit times are based on signals traveling the same distance. In some embodiments, controllers fire seismic sources only at the same absolute height of the seismic source(s).

Figure 2:
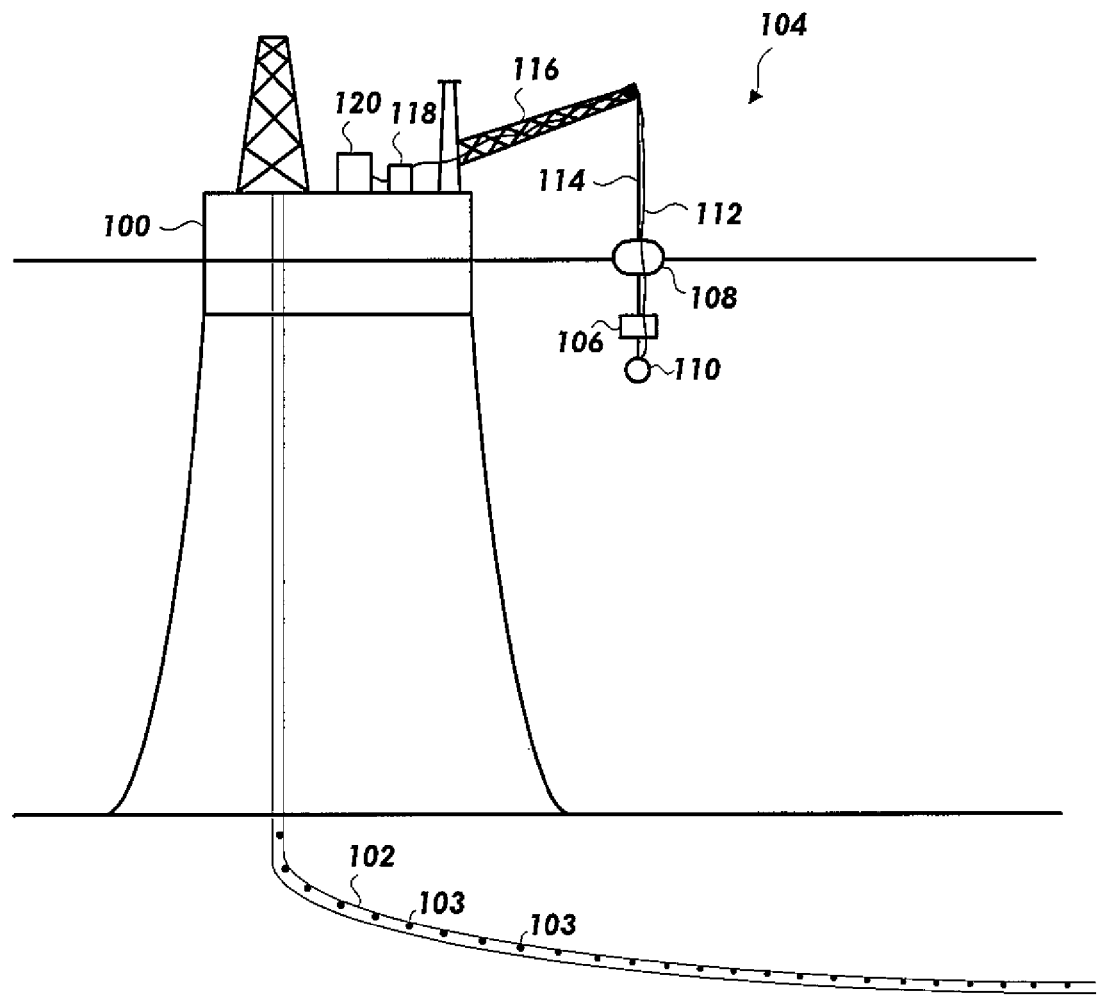
FIG. 2 is a simplified view of an offshore rig positioned over a borehole containing a plurality of receivers. The rig is shown supporting a conventional seismic survey apparatus.

Turning now to FIG. 2, a simplified view of an offshore rig (100) positioned over a subsea borehole (102) is shown. The borehole (102) contains a plurality of spaced receivers (103) to facilitate, for example, a VSP acquisition. The rig (100) is shown supporting a conventional seismic survey apparatus designated generally as (104). The survey apparatus (104) includes an air-gun or guns (106) suspended below the surface by a float (108). An analog hydrophone (110) is suspended below the air-gun (106). As discussed above, the hydrophone (110) can provide partial information for correcting time break errors (errors attributable to time differences for swells, irregular source firings, etc.) but not enough information for shot deconvolution. The hydrophone (110) of the typical survey apparatus (104) is not automatically calibrated and therefore dependent on the user, which often changes.

One or more analog lines (112) form part of an umbilical (114) that may also include an air line. The analog lines (112) traverse a handling system, such as a crane (116). The analog lines (112) provide an analog communications/control link between the guns (106), the hydrophone (110), a gun controller (118), and a computer processor (120). The gun controller (118) is arranged on the rig (100), far removed from the guns (106). Currently the lack of a display at the gun controller (118) or the computer processor (120) of the hydrophone readings or the air gun depth or pressure at the gun creates operational shortcomings. In addition, disconnection of the analog lines (112) while the air gun is powered can result in inadvertent firing of the air-gun (106) that may pose a safety hazard.

Therefore, according to the conventional arrangement of FIG. 2, seismic data quality is compromised. The position (referring primarily to depth) of the guns (106) is dependant on rig movement, waves, crane operation, and/or other factors. Prior to the teachings described herein, there has been no compensation or correction for changes in depth, no compensation for changes in air pressure, very limited ability to time the firing of the guns (106), and therefore the source signature of the guns (106) and the wave amplitude are far from optimal.

Figure 3:
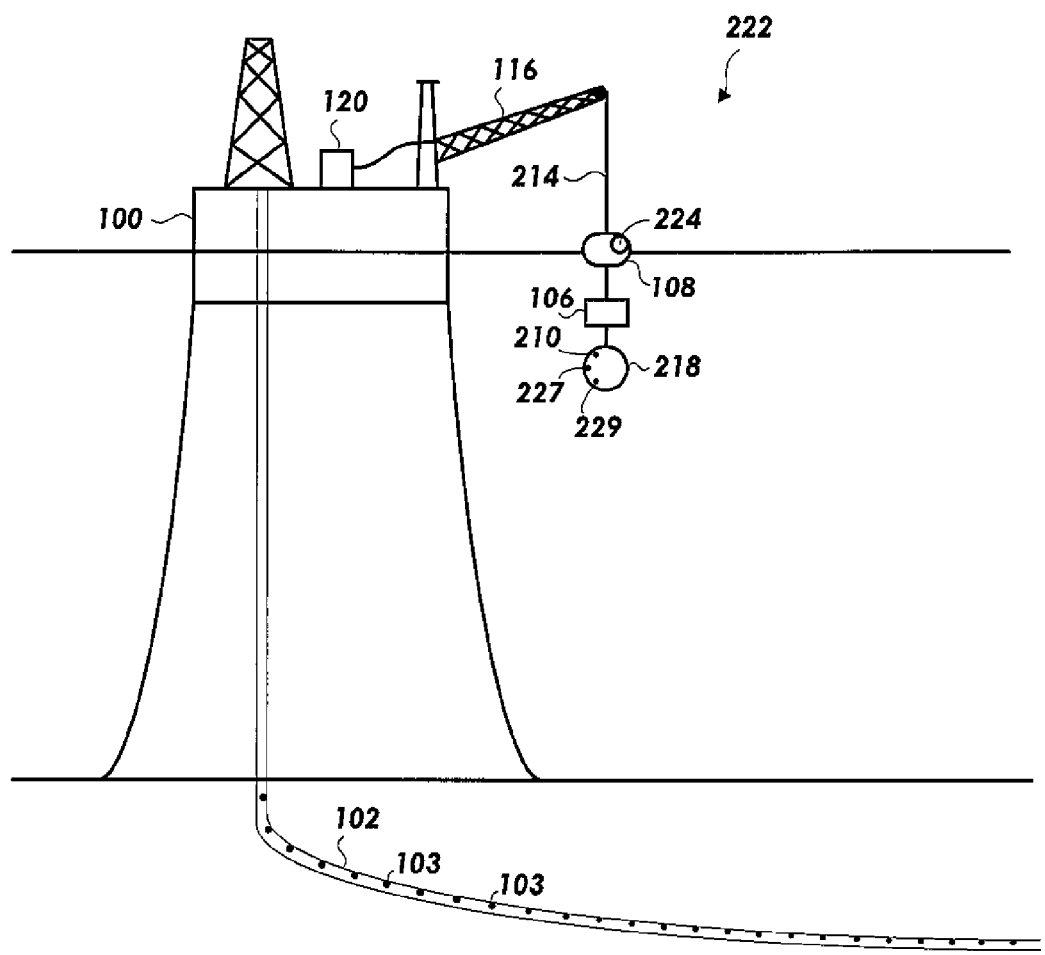
FIG. 3 is a simplified view of an offshore rig positioned over a borehole containing a plurality of receivers. The rig is shown supporting a seismic survey apparatus with a source control system according to one aspect of the present invention.

However, a source control system according to one aspect of the invention illustrated in FIG. 3 facilitates much more accurate seismic data. According to the arrangement of the FIG. 3, there is also an offshore rig (100) positioned over a subsea borehole (102) containing a plurality of receivers (103). The rig (100) is shown supporting the source control system and designated generally as (222). The rig (100) may be replaced, according to some embodiments, with a movable vessel. The source control system (222) includes a seismic source, a handling system, an umbilical (214), and an in-sea source controller (218) for controlling the firing of the seismic source. The source control system (222) and the borehole receivers (103) may be integrated to provide a borehole survey system.

According to the embodiment of FIG. 3 the seismic source is the air-gun (106), which may be a single gun, an array of guns, or any other arrangement. The handling system includes a crane (116) and associated apparatus to facilitate the deployment and retrieval of the source control system (222) and air gun (106). The umbilical (214) includes an air supply, which is operatively connected to a compressor. The compressor is preferably located on the rig (100). However, unlike the typical survey apparatus with long analog communication lines, the umbilical (214) of the source control system (222) according to FIG. 3 includes only digital communication lines between the in-sea source controller (218) and the processor (120) on the rig (100). The use of digital lines eliminates any crosstalk, signal leakage, and the potential for an inadvertent gun firing upon removal of the communication links. As mentioned above, the air gun (106) is controlled by the in-sea controller (218) and generates seismic waves that are received by the borehole receivers (103) to generate, for example, a VSP survey.

The source control system (222) may also include an attached float (108) to buoy the air gun (106), the in-sea controller (218), and any other in-sea apparatus. The float (108) may advantageously include a navigational system or motion sensor, such as a Global Positioning System (224) (UPS). GPS systems are readily available from a variety of sources. The UPS system (224), among other things, facilitates detection of changes in absolute height (due, for example, to waves or changes in tide). As mentioned above with reference to FIGS. 1A-1B, firing the air guns (4) at different absolute heights or different heights with respect to borehole sensors can adversely affect the determination of the source signature of the air gun (106) and/or other data (e.g. transit times) collected by the borehole receivers (103). Accordingly, the GPS system (224) feeds position information to the processor (120) and/or the in-sea source controller (218) so that the air-gun (106) may be fired repeatedly at and/or only at certain absolute heights. The firing of the air gun (106) at certain absolute heights may be controlled by a switch or other mechanism associated with the GPS system (224) or the in-sea controller (218), such that the air-gun is automatically fired at an absolute height (e.g. a fixed height relative to receivers in a borehole or a fixed height above the center of the earth). Conventional marine surveys fire air-guns at regular time intervals, regardless of absolute height. The addition of a motion sensor according to principles described herein increases the accuracy of the source signature determination, discussed in more detail below.

In addition to providing position information, the GPS system (224) may also receive and broadcast a time standard to the in-sea controller (218), the processor (120), and/or any navigation subsystems that may be used with source control system (222). This time standard may, for example, be Universal Time Coordinated (UTC). The UTC time standard may be supplied to various survey subsystems to synchronize the firing of the air guns (106) with the recording of data by the borehole receivers (103). According to some embodiments, there may also be surface receivers, the recording of which may also be synchronized with air gun (106) firing using the time standard provided by the GPS system (224).

Further, according to some embodiments, the in-sea source controller (218) may include one or more in-sea sensors providing signals to enable, among other things, source signature estimation. Preferably, the in-sea sensors are located at the in-sea source controller (218) and maintain a fixed geometry relative to the air gun (106) or other seismic source. The one or more in-sea sensors may include, but are not limited to: a calibrated digital hydrophone (210), a depth sensor (227), and an air pressure sensor (229). The one or more in-sea sensors may also include short analog communication lines to the in-sea source controller (218), where the signals may be digitized at the source for relay to the processor (120). Therefore, according to the embodiment of FIG. 3, if the source control system (222) includes analog lines, those lines are relatively short, instead of the very long analog lines found in previous survey systems that extend all the way from the seismic source to the rig. The hydrophone (210) according to the present invention provides improved fidelity of a near field signal because it is calibrated in-sea and digitized at the seismic source. In addition, the air pressure sensor (229) monitors air pressure supply at the air-gun source and reports firing pressure variations which can be taken into account when determining the source signature. Accordingly, the seismic source signature may be more accurately estimated by accounting for timing variations, hydrodynamic variations, pressure supply variations, etc., using the calibrated digital hydrophone (210) signal and air pressure readings at the seismic source.

Estimation of an accurate source signal is highly important to VSP processing. The source signal enables separation of the upgoing and downgoing wavefields. Inconsistent source signatures result in residuals in collected data by the multi-channel velocity filters used to separate wavefields. These residuals are effectively "noise" and can cause significant distortion to the processed results. With an ever-increasing focus on true amplitude and time-lapse borehole seismic measurements, source signature consistency is very important to VSP surveys. Good source signature estimation using the methods and apparatus taught herein increase the consistency of the source signature. Likewise, inaccurate or smeared transit times as described above can be reduced or eliminated by adhering to the principles described herein.

Calibrating the source signatures has in the past been accomplished by visual quality checks. These visual checks include, for example, looking for air guns that did not fire and ensuring the frequency response covers both low and high ends. Such checks are somewhat subjective, however, and even more so if the air-gun (106) reference far field source signature is unknown. According to the present embodiment having the in-sea source controller (218), however, the air-gun (106) source reference far field signatures are on file at the well site, so the source control system (222) can be programmed to automatically check the measured source signature against the reference source signature. By performing an automatic check, there is an assurance that for each well site setup the air-gun (106) source signature meets its performance acceptance criteria. Calibrated and consistent source signatures are important for evaluating the subsurface changes in time-lapse surveys. With a calibrated source signature, variations in seismic reflections will be representative of subsurface changes, instead of changes in the source signature.

Seismic sources signatures for VSP must be surface referenced, and if there is a change in datum level (e.g. as the air-gun (106) rises and falls in a rough sea), there will be small 1 or 2 ms time shifts. However, the changes in datum level may be eliminated or compensated for by using the GPS system (224) or other motion sensing equipment. Further, heretofore tidal corrections have not been made for borehole seismic measurements. While failing to make tidal corrections may be acceptable for deep-water surveys, depending on the time of day and the strength of the tide, there may be a significant affect on transit times in coastal areas. Therefore, according to some embodiments the source control system (222) includes an absolute height or depth sensor (227) to monitor the absolute height of the air gun (106) (which is below the water surface). The height or depth sensor (227) may be, for example, a commercially available bathymetry sensor. Variations in tide may then also be accounted for according to principles described herein. In addition, the air-gun (106) may be automatically disabled if the height or depth sensor (227) reports a depth less than a predetermined level. The attributes reported by the in-sea sensors may be automatically displayed at the processor (120) for a user to see.

In one embodiment, the configuration of the air-gun (106) may be an array or cluster arrangement, such as a three-gun cluster. However, any other air-gun arrangement may also be used. For example, some embodiments may include vertical air-gun arrays of up to eight guns or more. Prior methods are restricted to simultaneous firing of air guns. The digital in-sea controller (218) in the present invention provides the capability to stagger the firing of an array of air guns (106), which has previously been unavailable using rig-based analog controllers that lack the tuning flexibility to fire sequentially.

Figure 4:
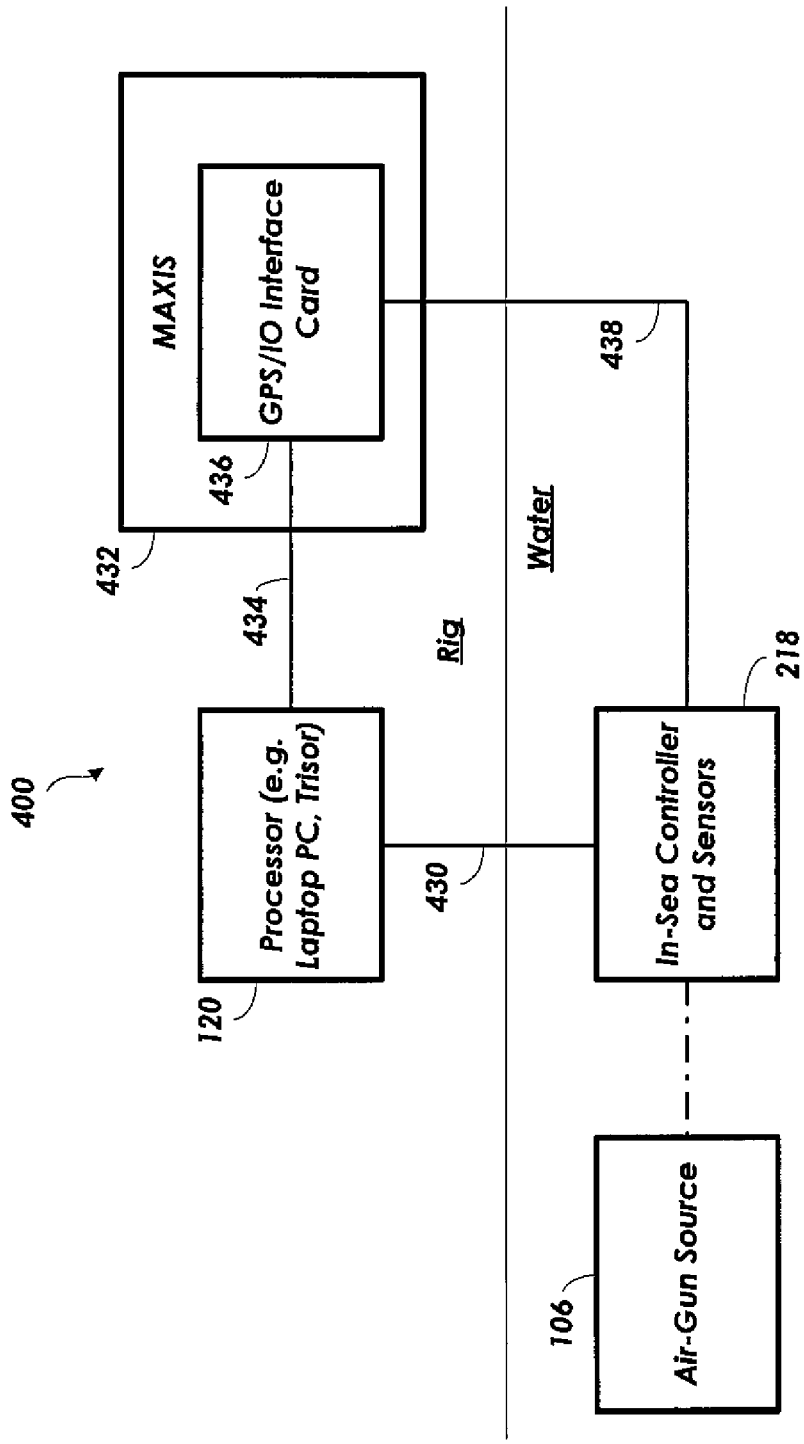
FIG. 4 is a schematic diagram illustrating a source control system according to one aspect of the present invention.

Referring next to FIG. 4, a schematic illustration of one possible source control system (400) configuration according to aspects of the present invention is shown. As shown in FIG. 4, the processor (120) may be a laptop computer running a digital source control program. The processor (120) may control and/or monitor the in-sea controller and sensors (218) described above with reference to FIG. 3, which may also include the GPS system (224, FIG. 3). The communication interface between the processor (120) and the in-sea controller (218) and sensors (227, 229) is preferably a digital link (430). This digital link (430) may be used for pre-testing the system in preparation for data acquisition. The processor (120) may also link with an acquisition and imaging system (432), for example Schlumberger's MAXIS™ (Multitask Acquisition and Imaging System) system via another digital interface (434). The acquisition and imaging system (432) may include a GPS digital data interface (436) as shown. Alternatively, the processor (120) may contain a GPS digital data interface (436). The processor (120) and acquisition and imaging system (432) are located on the rig according to the illustration of FIG. 4, however, as the name suggests, the in-sea controller and sensors (218) are located in the water adjacent the air-gun (106) or other seismic source. The in-sea controller and sensors (218) may also have a digital interface (438) with the acquisition and imaging system (432). This direct digital interface (438) may provide the primary interface with the acquisition and imaging system (432) during data acquisition. The only analog interface (440) of the source control system (400) extends the short distance between the in-sea controller and sensors (218) and the air-gun source (106).

Figure 5:
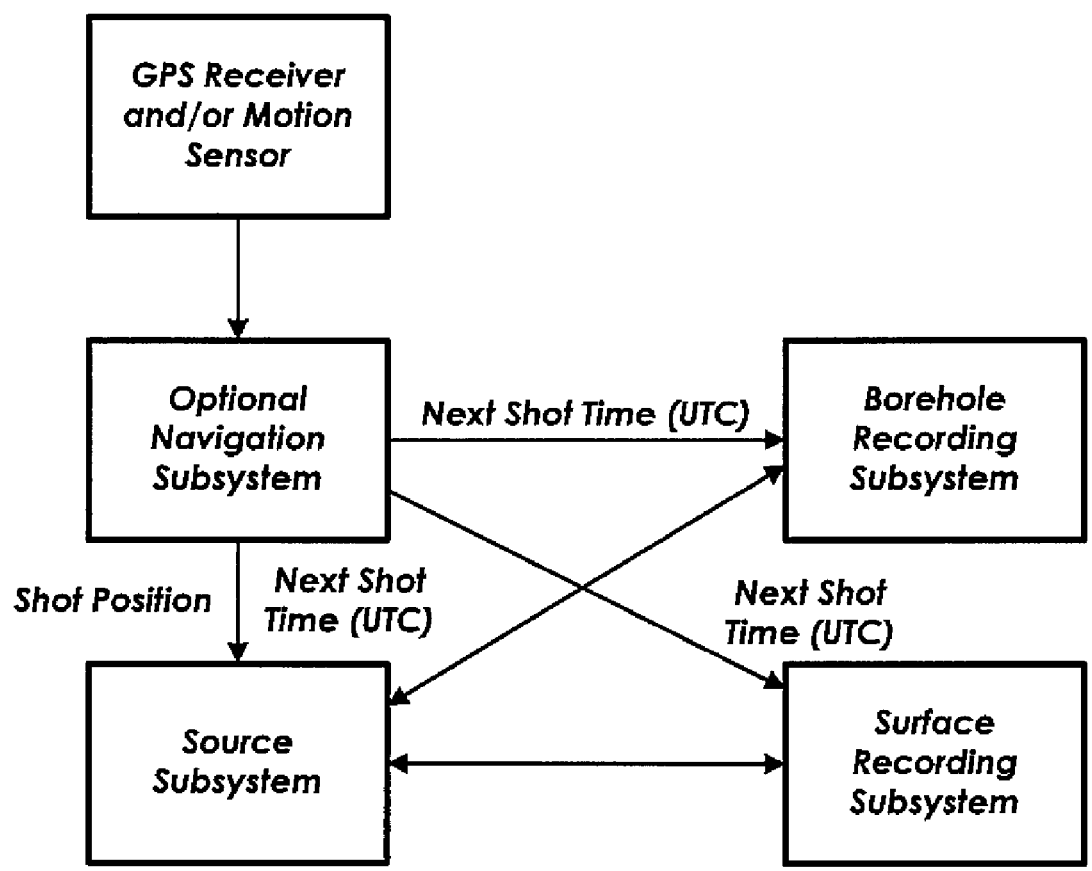
FIG. 5 is a schematic illustration of a source control method according to one aspect of the present invention.
Figure 6:
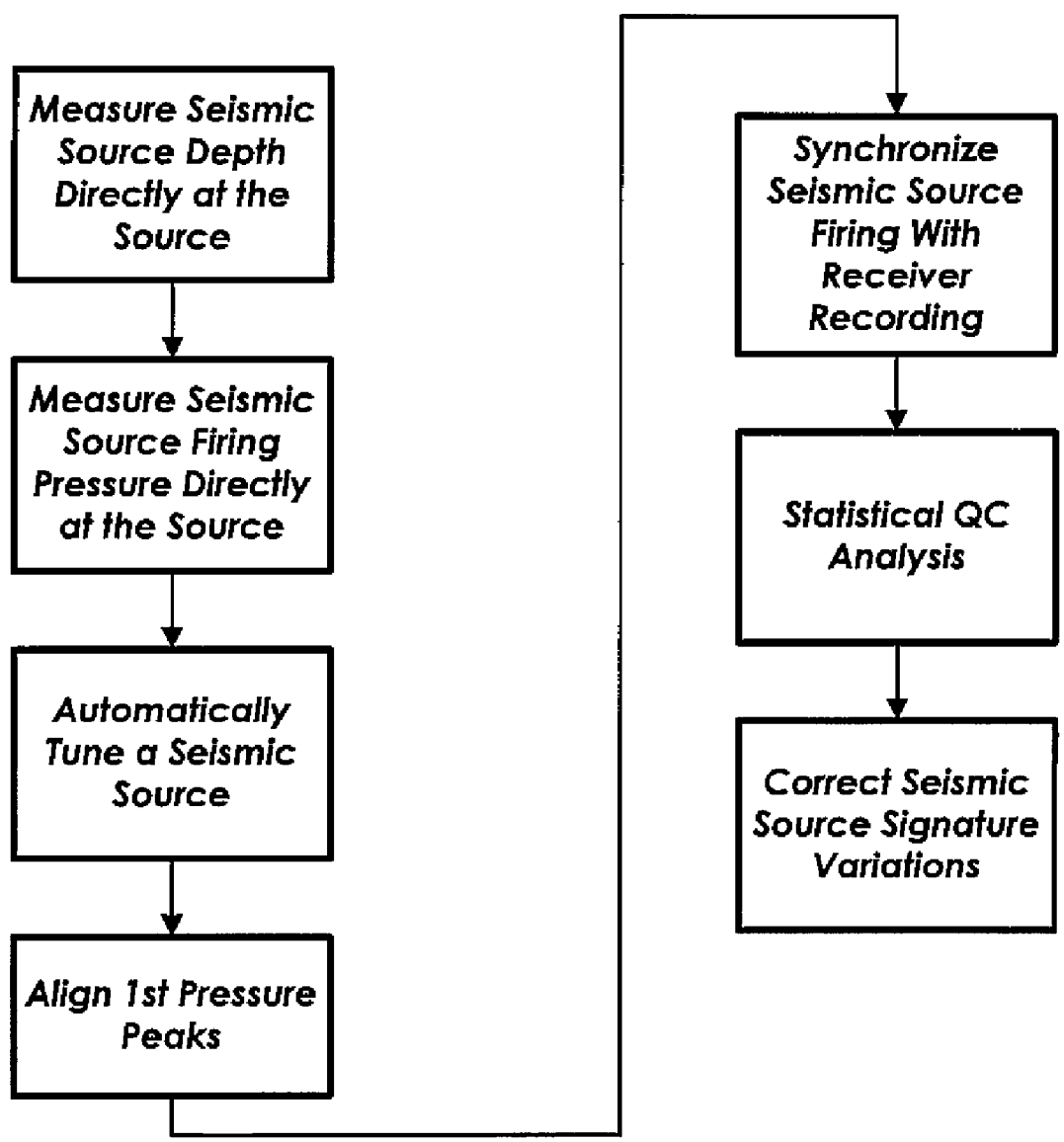
FIG. 6 is a schematic illustration of a source control method according to another aspect of the present invention.

Turning next to FIGS. 5-6 schematic illustrations representing methods of using the source control system (222) and/or improving a VSP survey are shown. It will be understood, however, that the methods shown and described are not limited to the particular sequences shown, nor must all the steps described be performed. The steps described may be accomplished in any of a number of sequences. According to one method, a seismic source such as an air-gun cluster (FIG. 3) is automatically tuned, for example, by the in-sea source controller (218). The in-sea source controller (218) may keep individual air-guns (106, FIGS. 3-4) firing in synchronization with one another by aligning first pressure peaks detected by the hydrophone (210, FIG. 3) located adjacent the air-guns (106, FIGS. 3-4). "First" can, but does not necessarily mean, the pressure peak that arrives first in time. "First" may also mean "one" or "a."

Therefore, according to some embodiments, the in-sea source controller (218) may tune or synchronize individual air-guns (218) with one another by aligning the pressure peaks, by aligning low frequency bubble peaks, or by other methods.

Some attempts to reduce the problems with ghosting have focused on programming a fixed delay between the firing of each air gun. Nevertheless, salinity, temperature, depth, bubbles, and other phenomena significantly affect the velocity of a pressure wave through water. Air bubbles generated by the firing of the first air gun may have the most profound affect on the velocity of pressure waves through the water. Accordingly, even a fixed firing delay may result in ghosting (a notch frequency) and inaccurate seismic measurements. Therefore, in some embodiments, each seismic source, such as an air gun, is fired sequentially or staggered to substantially maximize the amplitude of the pressure wave. Substantially maximizing the amplitude yields, among other things, increased bandwidth, a reduction of high-frequency notches and enhancement of low frequencies, reduced susceptibility to rough-sea reflections, and a more omni-directional source pattern.

In some embodiments, the sequential or staggered firing is active or dynamic. The advancing pressure wave is measured for each firing, allowing the firing of each air gun in a staggered array to be adjusted in time to continually align and substantially maximize the amplitude of the downgoing pressure wave.

In one embodiment, air guns are spaced vertically and fired with dynamic time delays to align and/or maximize the amplitude of the downgoing pressure wave while also minimizing sea surface reflection. A staggered air gun array's advancing pressure wave may be measured by an in-sea sensor at each air gun (except for the first air gun, which would not need a time adjustment if it fires first in time, but could have a sensor for other reasons), allowing firing of the next deeper air gun in the air gun array to be adjusted in time to continually substantially maximize the amplitude by superimposition of the pressure waves. In one embodiment, as each air gun in the staggered array is positioned at a corresponding deeper location from a sea surface, the advancing wave continues to be measured and each air gun is fired based on the feedback from sensors detecting the advancing wave. Adjusting the firing of each deeper air gun reduces the ghosting effects related to vertical air gun deployments. Moreover, a synchronization unit may use the in-sea sensor measurements of the downgoing pressure wave to synchronize the staggered array firing with the recording of receivers in the borehole.

Figure 7:
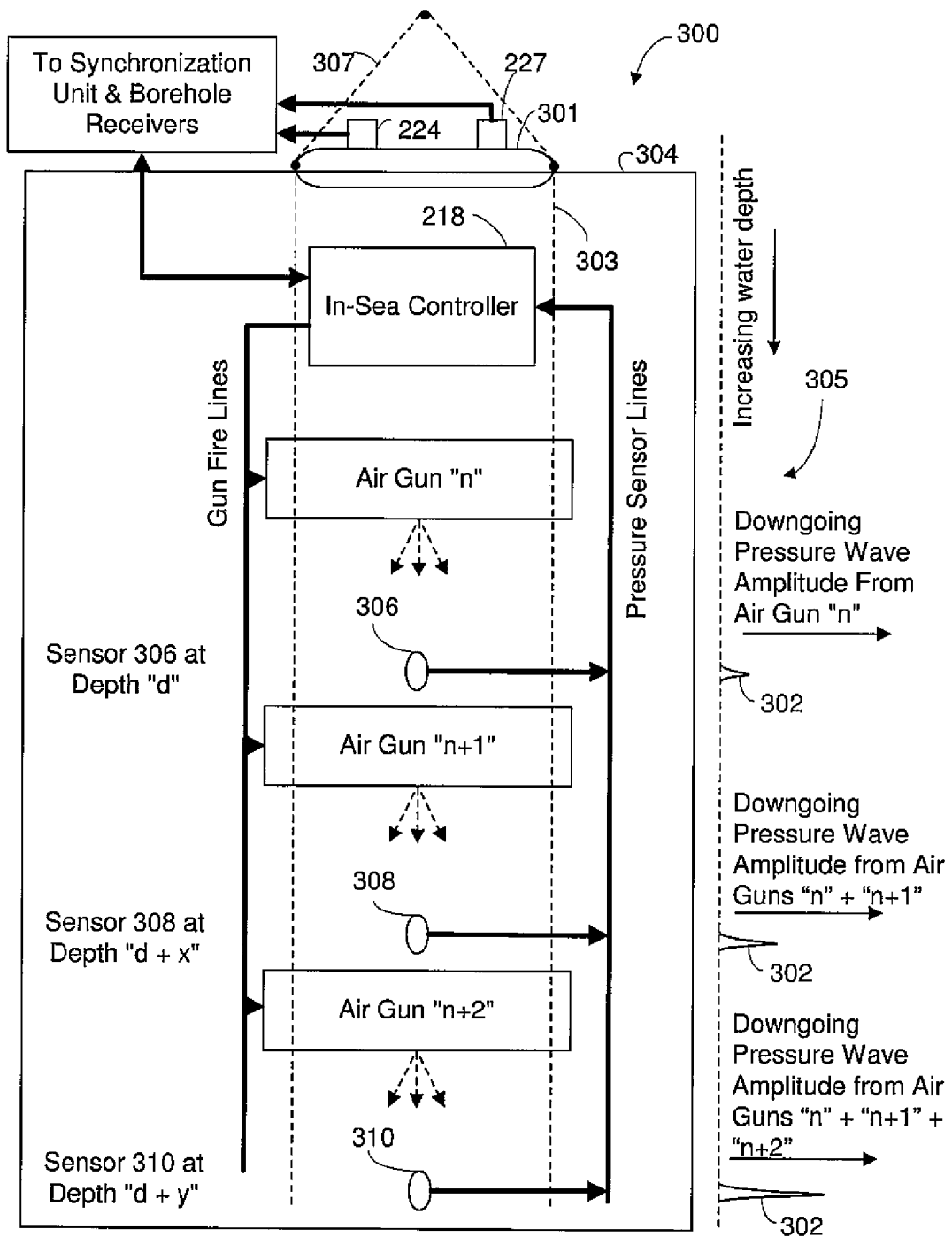
FIG. 7 is a schematic illustration of a seismic survey system according to one aspect of the present invention.

Referring to FIG. 7, a seismic system such as a seismic survey system (300) may stand alone or be part of a survey apparatus such as the survey apparatus (104, FIG. 2) described above with reference to FIG. 2. The seismic survey system (300) of FIG. 7 may replace some or all of the subsea components described above with reference to FIG. 3. The seismic survey system (300) may comprise a first seismic source such as a first air gun (n) that is closest to a sea surface (304). The seismic survey system (300) may also comprise an array (305) of seismic sources or air guns and therefore include at least a second air gun (n+1) spaced vertically from the first air gun (n). The array (305) may include any number of seismic sources, including the three shown in FIG. 7. In one embodiment, a first seismic sensor such as a first hydrophone (306) may be located at the second air gun (n+1). In addition, in one embodiment, a controller, such as the in-sea controller (218), is operatively connected to the first and second air guns (n, n+1) and the first hydrophone (306). The in-sea controller (218) may be replaced by a controller that is not underwater. The air guns (n, n+1, etc.) may be suspended from a float (301) via hanging chains (303). The float (301) may also be attached to lifting chains (307), which enable deployment and retrieval of the float (301), in-sea controller (218), and air run array (n, n+1, etc.). One or more sensors may be disposed on the float (301), such as the GPS system (224) and the motion or bathymetry sensor (227).

The in-sea controller (218) manages the firing times of each of the air guns (n, n+1, etc.) and receives feedback from the first hydrophone (306) (and, in some embodiments, additional hydrophones or other sensors). When the in-sea controller (218) fires the first air gun (n), it generates an advancing pressure wave (302). The first hydrophone (306) measures the advancing pressure wave (302) and communicates advancing pressure wave data to the in-sea controller (218). The in-sea controller monitors the advancing pressure wave data and staggers the timing of the firing of the next air gun (n+1) based on the feedback from the first hydrophone (306). Thus, the in-sea controller (218) may fire the second air gun (n+1) to align and/or substantially maximize the amplitude of the downgoing pressure waves by superimposition. For example, in some embodiments the in-sea controller (218) fires or is programmed to fire the second (n+1) and subsequent air guns (n+2, etc.) to align a first pressure peak of each seismic source. This routine may continue and be repeated for any number of additional air guns, each of which may have an associated hydrophone. However, the hydrophones can be spaced independently of the air guns as well and still report useful information to the in-sea controller for delayed firing of subsequent air guns.

FIG. 7 illustrates a third air gun (n+2) and an associated second hydrophone (308) and a third hydrophone (310) that may be associated with an additional (not shown) air gun. The air guns may be arranged deeper and deeper at constant or varying spacing. Because the in-sea controller (218) dynamically adjusts firing times of each air gun based on feedback from seismic sensors, the spacing between air guns does not have to be constant, and changes in wave velocity due to bubbles (especially as air guns are fired), salinity, temperature, or other factors are accounted for because each air gun (after the first (n)) is fired based on feedback or data from the actual advancing wave as a result of the last air gun(s) firing.

In one embodiment, a synchronization unit such as the GPS system (224, FIG. 3) may receive feedback from the in-sea controller (218) near the surface (304) to synchronize the staggered array (305) firing with the recording of the receivers (103, FIG. 3) in the borehole (102, FIG. 3). In one embodiment, the borehole receivers (103, FIG. 3) comprise Geophone Accelerometer (GAC) sensors from Schlumberger Technology Corporation, where the measured sensor response is flat to 3 Hz. Other receivers may also be used.

In one embodiment, air gun chamber volume for each individual air gun (n, n+1, n+2, etc.) is adjusted from one air gun to the next. Air gun chamber volume may be selected to compensate for variations in source signature output caused by increasing water pressure with depth. One of ordinary skill in the art having the benefit of this disclosure may select and change air gun chamber volume based on depth to optimize source signals.

The principles described herein may have application to all borehole seismic surveys and other applications as well. The principles described herein provide high quality, consistent source signatures, even under varying sea surface conditions. Deep water or deep well exploration may benefit from the principles described herein. Using conventional apparatus and techniques, the seismic source signature can be compromised by the effects of attenuation and earth filtering. However, the principles and apparatus taught herein may overcome some of the weaknesses associated with conventional apparatus. Moreover, the principles described herein may have application to amplitude versus offset (AVO) analysis, where consistency of measured source signal is critical. The principles may also be useful for inversions and look-ahead analysis (prediction ahead of the borehole depth), where strong low frequency signature may be essential to the interpretation.

Some methods of using the source control system (222, FIG. 3) or improving a VSP survey may further include measuring the air-gun (106 in FIG. 3; n, n+1, etc. in FIG. 7) pressure directly at the source. The measurement of air-gun (106 in FIG. 3; n, n+1, etc. in FIG. 7) pressure may be facilitated, for example, by the pressure sensor (229, FIG. 3) of the in-sea sensor arrangement described above with reference to FIG. 3. The depth of the air-gun (106 in FIG. 3; n, n+1, etc. in FIG. 7) may also be measured directly by the source. The measurement of air-gun (106 in FIG. 3; n, n+1, etc. in FIG. 7) depth may be facilitated, for example, by a bathymetry sensor or other depth sensor (227, FIG. 3) as described above. Some methods may also include integrating a firing of the air-gun (106 in FIG. 3; n, n+1, etc. in FIG. 7) with a navigation system to facilitate air-gun (106 in FIG. 3; n, n+1, etc. in FIG. 7) firing at either a precise time or a precise, absolute vertical position, both, or neither. Some of the advantages of firing the air-gun (106 in FIG. 3; n, n+1, etc. in FIG. 7) or other seismic source only at precise, absolute, positions are described above.

The navigation system for facilitating air-gun (106 in FIG. 3; n, n+1, etc. in FIG. 7) firing at certain vertical positions may be, for example, the GPS system (224, FIG. 3) discussed with reference to FIG. 3, which receives and broadcasts precise position data. The GPS system (224, FIG. 3) may also receive and broadcast a time standard such as UTC. Accordingly, the air-gun (106 in FIG. 3; n, n+1, etc. in FIG. 7) may be controlled according to time and position information received from the GPS system (224, FIG. 3), and fired only at a certain, predetermined absolute height (e.g. fixed heights relative to receivers in a borehole) to reduce or eliminate time-shift errors. Further, as mentioned above, according to some methods, the firing of each air-gun (106 in FIG. 3; n, n+1, etc. in FIG. 7) may be staggered in time and synchronized with downhole seismic receiver recording according to UTC time or another time standard. Indexing the data according to a time standard facilitates pre-sorting of the data for processing. Indexing the source performance and the receivers' recording according to a time standard also permits these data to be combined in the same dataset or file, thereby facilitating review, reporting, or data processing. Statistical quality control (QC) analysis of surface source performance and the borehole receiver (103, FIG. 3) performance may then be combined. In some cases, firing of the air-gun (106 in FIG. 3; n, n+1, etc. in FIG. 7) may also be synchronized with surface seismic receiver recording. Accordingly, statistical quality control (QC) analysis could then be performed for the synchronized data set, including surface source signal, signals received by surface receivers, and signals received by borehole receivers.

According to some methods, a correction is made for source signature variations. Source signature variations may result, for example, from firing pressure air changes, temperature changes, rough seas, or tidal variations. The correction may include calibrating a near field sensor signal received by the hydrophone (210, FIG. 3; 306-310, FIG. 7) located at the air-gun (106 in FIG. 3; n, n+1, etc. in FIG. 7) or other seismic source, according to the fixed geometry of the air-gun (106 in FIG. 3; n, n+1, etc. in FIG. 7) to the hydrophone (210, FIG. 3; 306-310, FIG. 7). The hydrophone (210, FIG. 3; 306-310, FIG. 7) may be part of the in-sea sensor package discussed above. The correction may further include reconstructing the far field signature of the air-gun (106 in FIG. 3; n, n+1, etc. in FIG. 7) or other source from measured near field signature, and maintaining true amplitude for surface seismic calibrations, AVO surveys, and time-lapse surveys. In addition, corrections of the source signature may be made by comparing measured source signatures to a reference source signature, where the reference source signature is based on a seismic source reference far field signature on file at the well site.

The preceding description has been presented only to illustrate and describe certain embodiments. It is not intended to be exhaustive or to limit the invention to any precise form disclosed. Many modifications and variations are possible in light of the above teaching.

The embodiments and aspects were chosen and described in order to best explain the principles of the invention and its practical application. The preceding description is intended to enable others skilled in the art to best utilize the principles in various embodiments and aspects and with various modifications as are suited to the particular use contemplated. It is intended that the scope of the invention be defined by the following claims.

What is claimed is:

1. A seismic system comprising:
   a first seismic source;
   a second seismic source spaced vertically from the first seismic source;
   a first seismic sensor at the second seismic source;
   a controller operatively connected to the first and second seismic sources and the first seismic sensor;
   wherein the controller is programmed to fire the first seismic source and dynamically adjust a firing time of the second seismic source based on feedback from the first seismic sensor in a single sequence of firing.

2. A seismic system according to claim 1, wherein the controller is programmed to tune or synchronize the firing time of the second seismic source based on feedback from the first seismic sensor.

3. A seismic system according to claim 1, wherein the controller is programmed to adjust the firing time of the second seismic source based on feedback from the first seismic sensor to align a first pressure peak of the second seismic source with a first pressure peak of the first seismic source.

4. A seismic system according to claim 1, further comprising:
   a third seismic source spaced vertically from the second seismic source;
   a second seismic sensor at the third seismic source, the controller operatively connected to the third seismic source and the second seismic sensor;
   wherein the controller is programmed to adjust the firing time of the second seismic source based on feedback from the first seismic sensor to align a first pressure peak of the second seismic source with a first pressure peak of the first seismic source;
   wherein the controller is programmed to adjust a firing time of the third seismic source based on feedback from the second seismic sensor to align a first pressure peak of the third seismic source with the first pressure peaks of the first and second seismic sources.

5. A seismic system according to claim 4, wherein each of the seismic sources comprises an air gun chamber of different volume to compensate for variations in source signature caused by increasing water pressure with depth.

6. A seismic system according to claim 1, wherein the controller is an in-sea controller.

7. A seismic system according to claim 1, wherein the first and second seismic sources comprise in-sea air guns.

8. A seismic system according to claim 1, further comprising:
a plurality of receivers deployed in a borehole;
a synchronization unit operatively connected to the plurality of receivers and the controller;
wherein the synchronization unit synchronizes staggered seismic source firing with recording of the plurality of receivers in the borehole.

9. A seismic system according to claim 1, further comprising:
a plurality of additional vertically spaced seismic sources;
a seismic sensor at each of the plurality of additional vertically spaced seismic sources, the controller operatively connected to each of the plurality additional seismic sources and each seismic sensor;
wherein the controller is programmed to adjust the firing time of each of the plurality of additional vertically spaced seismic sources based on feedback from the seismic sensors to align first pressure peaks of each of the plurality of additional vertically spaced seismic sources with a first pressure peak of the first seismic source.

10. A seismic system according to claim 9, wherein each of the seismic sources comprises an air gun chamber of different volume to compensate for variations in source signature caused by increasing water pressure with depth.

11. A survey system comprising:
a plurality of receivers deployed in a subsea borehole;
a seismic source array aligned vertically in-sea at the surface;
at least one seismic sensor at one or more individual sources of the seismic source array;
an in-sea source controller configured to sequentially fire the individual sources of the seismic source array and align first pressure peaks of the individual sources, wherein the in-sea source controller receives feedback from progressively deeper sensors of the at least one seismic sensor and dynamically adjusts firing of the individual sources of the array in response to the feedback within a single sequence of firing.

12. A survey system according to claim 11, wherein the at least one seismic sensor comprises a seismic sensor at each individual source except for a first individual source, the seismic sensors providing feedback to the in-sea source controller to facilitate the aligning of first pressure peaks.

13. A survey system according to claim 11, wherein the system is at a fixed horizontal set of coordinates.

14. A survey system according to claim 11, wherein the in-sea source controller is programmed to repeatedly fire the seismic source array at a same absolute height.

15. A survey system according to claim 11, further comprising a synchronization unit operatively connected to the plurality of receivers and the controller;
wherein the synchronization unit synchronizes the sequential source firing with recording of the plurality of receivers deployed in the subsea borehole.

16. A survey system according to claim 11, wherein the in-sea source controller is configured to dynamically change the sequential firing of the individual sources of the seismic source array to align first pressure peaks of the individual sources.

17. A method of controlling in-sea seismic source firing, comprising:
quantifying changes in a velocity of a pressure wave in water based on changes in one or more of salinity, temperature, and bubbles in the water;
dynamically staggering firing of an in-sea array of seismic sources based on the changes, wherein dynamically staggering firing comprises;
receiving feedback from one or more seismic sensors local to the in-sea array, wherein the feedback is correlated to the changes;
staggering a firing sequence of the in-sea array of seismic sources based on the feedback, within a single sequence of firing; and
increasing amplitude of a pressure wave generated by the staggered firing.

18. A method of controlling in-sea seismic source firing according to claim 17, wherein the dynamically staggering firing comprises:
receiving seismic feedback from a plurality of seismic sensors, wherein there is at least one of the plurality of seismic sensors associated with all but a first individual source of the in-sea array;
staggering a firing sequence of the in-sea array of seismic sources based on the feedback.

19. A method of controlling in-sea seismic source firing according to claim 17, wherein the dynamically staggering firing comprises:
firing a first individual seismic source of the in-sea array;
detecting a first pressure peak resulting from the firing of the first individual seismic source;
sending first pressure peak data to a controller;
firing a second individual seismic source of the in-sea array based on first pressure peak data.

20. A method of controlling in-sea seismic source firing according to claim 17, wherein the dynamically staggering firing comprises:
firing a first seismic source of the in-sea array;
detecting a first pressure peak resulting from the firing of the first seismic source;
sending first pressure peak data to a controller;
firing a second seismic source of the in-sea array based on first pressure peak data;
and wherein the increasing amplitude of a pressure wave comprises:
aligning a first pressure peak of the second seismic source with the first pressure peak of the first seismic source.

21. A method of controlling in-sea seismic source firing according to claim 17, wherein the dynamically staggering firing comprises:
firing a first seismic source of the in-sea array;
detecting a first pressure peak resulting from the firing of the first seismic source;
sending first pressure peak data to a controller;
firing a second seismic source of the in-sea array based on first pressure peak data;
detecting a first pressure peak resulting from the firing of the first and second seismic sources;
sending first pressure peak data resulting from the firing of the first and second seismic sources to a controller;
firing a third seismic source of the in-sea array based on the first pressure peak data resulting from the firing of the first and second seismic sources;
and wherein the increasing amplitude of a pressure wave comprises:
aligning first pressure peaks of the second and third seismic sources with the first pressure peak of the first seismic source.

22. A method of controlling in-sea seismic source firing according to claim 17, wherein the dynamically staggering firing comprises:
a) firing a seismic source of the in-sea array;
b) detecting a first pressure peak resulting from the firing of the seismic source;
c) sending first pressure peak data to a controller;
d) firing a subsequent seismic source of the in-sea array based on first pressure peak data;
e) repeating steps (a)-(d) for each seismic source of the in-sea array; and wherein the increasing amplitude of a pressure wave comprises:
aligning first pressure peaks of each seismic source.

23. A method of controlling in-sea seismic source firing according to claim 17, wherein the dynamically staggering firing comprises:
a) firing a first air gun under water at a first depth closest to surface;
b) monitoring a first pressure wave from the first air gun with a first sensor;
c) feeding back monitored first pressure wave data to a controller;
d) firing a second air gun at a second depth, the second depth deeper than the first depth, based on monitored first pressure wave data to substantially maximize wave amplitude by superposition of pressure waves from the first and second air guns;
e) receiving wave data related to a subsurface formation resulting from the firing of the air guns.

24. A method of controlling in-sea seismic source firing according to claim 23, further comprising:
firing additional air guns sequentially, each deeper than the last, based on monitored pressure wave data from previous firings, to further substantially maximize wave amplitude by superposition of pressure waves from all air guns.

25. A method, comprising:
firing an air gun under water at a first location;
measuring a downgoing pressure wave resulting from the firing of the air gun at a second, deeper location corresponding to one or more additional airguns;
adjusting a firing time of the additional air guns based on parameters related to the downgoing pressure wave;
subsequently firing the additional air guns;
actively adjusting a firing time of each subsequently fired additional air gun to continually align pressure peaks of all of the air guns within a single sequence of firing.

26. A method according to claim 25, wherein the actively adjusting further comprises increasing an amplitude of the downgoing pressure wave.

27. A method according to claim 25, wherein the actively adjusting comprises feeding measurements of the downgoing pressure wave at sequentially deeper locations to an air gun controller.

* * * * *